United States Patent
Shiramizu et al.

(10) Patent No.: US 7,475,822 B2
(45) Date of Patent: Jan. 13, 2009

(54) DEVICE FOR READING OPTICAL DATA CODE

(75) Inventors: Gaku Shiramizu, Ayabe (JP); Takuya Murata, Ayabe (JP); Katsuki Nakajima, Fukuchiyama (JP)

(73) Assignee: OMRON Corporation, Kyoto (JP)

( * ) Notice: Subject to any disclaimer, the term of this patent is extended or adjusted under 35 U.S.C. 154(b) by 499 days.

(21) Appl. No.: 11/296,517

(22) Filed: Dec. 6, 2005

(65) Prior Publication Data

US 2006/0118629 A1 Jun. 8, 2006

(30) Foreign Application Priority Data

Dec. 8, 2004 (JP) ............... 2004-354900

(51) Int. Cl.
*G06K 7/10* (2006.01)
(52) U.S. Cl. ............... 235/462.06; 235/462.11; 235/462.23; 235/462.24; 235/462.26; 235/462.41
(58) Field of Classification Search ........... 235/462.06, 235/462.11, 462.23, 462.24, 462.26, 462.41
See application file for complete search history.

(56) References Cited

U.S. PATENT DOCUMENTS 5,784,102 A 7/1998 Hussey et al.
6,549,239 B1 * 4/2003 Tao ............................ 348/371
2003/0156121 A1 * 8/2003 Willis ......................... 345/606

FOREIGN PATENT DOCUMENTS

JP 2004194172 7/2004

OTHER PUBLICATIONS

German patent application No. 102005058740.2-53, Examination Report dated Jul. 5, 2007.

* cited by examiner

*Primary Examiner*—Michael G Lee
*Assistant Examiner*—Kristy A Haupt
(74) *Attorney, Agent, or Firm*—Weaver Austin Villeneuve & Sampson LLP

(57) ABSTRACT

An optical data code reader includes an illuminator device for illuminating an optical data code to be read out, an image-taking device for taking an image of this optical data code, a readout device for decoding the optical data code by processing image data generated by the image-taking device and an adjustment device for carrying out an adjustment process. The adjustment device adjusts an illumination condition of the illuminator device and/or an image-taking condition for the image-taking device such that the image data become suitable for being read out. The adjustment device serves to set areas on image data outputted by the image-taking device, to extract a variation amplitude of brightness in each of the areas and to carry out the adjustment process by using the image data of at least one of the areas in which the extracted variation amplitude is greater than a specified threshold value.

14 Claims, 8 Drawing Sheets

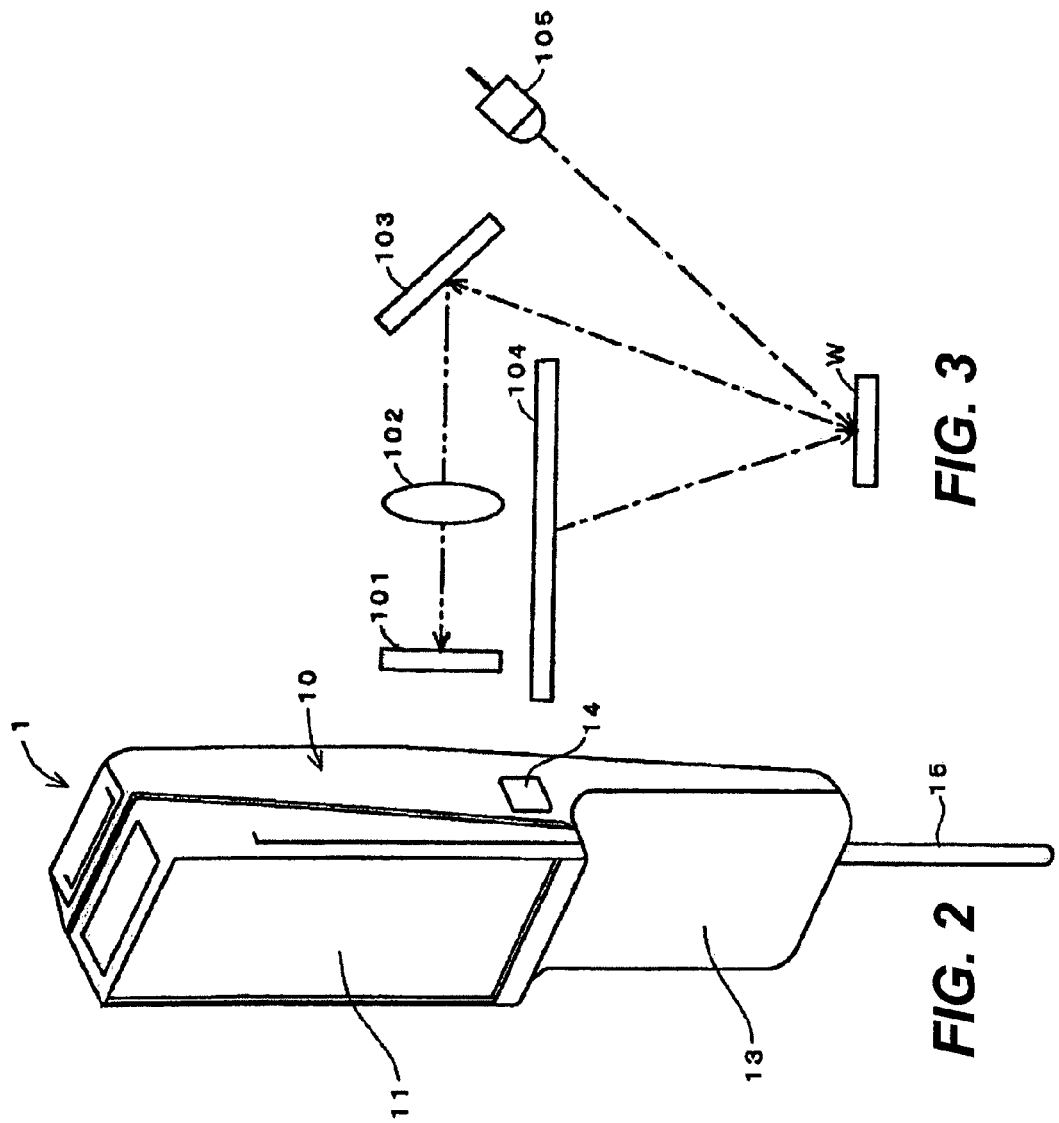
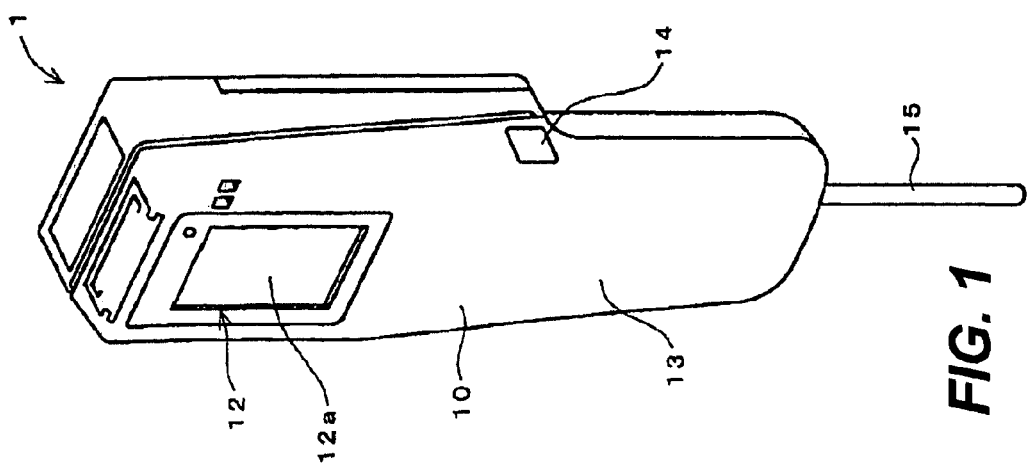

DEVICE FOR READING OPTICAL DATA CODE

Priority is claimed on Japanese Patent Application 2004-354900 filed Dec. 8, 2004.

BACKGROUND OF THE INVENTION

This invention relates to a device for reading data code, or an optical data code reader adapted to take an image of an optical data code such as a bar code or a two-dimensional code (hereinafter referred to simply as "code"), to carry out an image processing process on the code within the generated image and to thereby read out the data encoded in this code. In particular, this invention relates to such an optical data code reader provided with the function of adjusting to optimum conditions for taking images and illumination for the readout processing by making use of the generated image.

Most optical data code readers are comprised of an image-taking part including an image-taking element such as a CCD or an MOS and an illuminating part including an LED and are adapted to generate an image in response to a trigger signal and to decode an optical data code in such an image. In order to maintain a high level of readout accuracy with a device of this kind, its image-taking conditions such as the shutter speed and the illumination conditions such as the illumination intensity must be adjusted to optimum conditions. Especially when an optical data code directly marked on the surface of a workpiece by laser light or a marking press is to be read out, the brightness of the image fluctuates significantly because the reflectivity and the propagation direction of the reflected light change, depending upon the surface condition of the workpiece and the marking method. Thus, the image-taking and illumination conditions must be adjusted individually according to the kind of the workpiece and the marking method used for the code.

Adjustments of the kind described above have mostly been carried out manually by a user but since the adjustment setting by such a method is time-consuming and since different operators tend to make adjustments differently, automatic methods for carrying out adjustments are coming to be considered. Methods for automatically adjusting the shutter speed such as AEC (auto-exposure control) and AGC (auto-gain control) may be utilized for the purpose.

Japanese Patent Publication Tokkai 2004-194172 has disclosed a method of optimizing the shutter speed by repeating a plurality of cycles of processes of taking an image of an optical data code, extracting a specified characteristic of a pixel level from the generated image and adjusting the shutter speed based on the extracted characteristic. According to this method, a maximum brightness level is extracted from an image and the shutter level is adjusted until this maximum level reaches a specified numerical range. If there is a portion with a very high reflectivity in the background of an optical data code (corresponding, say, to an edge of or a step on a workpiece), however, the adjustment may be carried out on the basis of the brightness of such a portion and the brightness of the code part may not be optimized.

SUMMARY OF THE INVENTION

The present invention was accomplished in view of this problem and its object is to improve the readout accuracy by carrying out the adjustment based on the brightness of the optical data code to be read out.

In the above, "optical data code" may be understood to means a symbol that includes a visually recognizable pattern having specified data encoded. Representative examples of optical data code include bar codes and two-dimensional codes. Visually recognizable data shown by an optical data code such as arrangements of white and black areas are herein referred to as optical data.

This invention relates to an optical data code reader comprising an illuminator device for illuminating an optical data code to be read out, an image-taking device for taking an image of this optical data code, a readout device for decoding the optical data code by processing image data generated by the image-taking device and an adjustment device for carrying out an adjustment process by adjusting at least one condition selected from the group consisting of illumination conditions of the illuminator device and image-taking conditions for the image-taking device such that the image data become suitable for being read out. The adjustment device serves to set areas on image data outputted by the image-taking device, to extract a variation amplitude of brightness in each of the areas and to carry out the adjustment process by using the image data of at least one of the areas in which the extracted variation amplitude is greater than a specified threshold value.

In the above, the illuminator device, the image-taking device, the readout device and the adjustment device may all be mounted to a single box-like structure but this is not a necessary requirement. The illuminator device and the image-taking device, for example, may be formed independently as a sensor head. The adjustment device may also be included in such a sensor head. The optical data code reader of this invention may preferably also include an output means for displaying or externally outputting various data decoded by the readout device.

The illuminator device may include not only a light source such as an LED but also a circuit for controlling it to be switched on and off. A type capable of varying the quantity of illuminating light is preferable. It may be adapted to vary the direction and color of illumination.

The image-taking device includes an image-taking element such as a CCD or a MOS and a lens, adapted to take an image of an optical data code to generate an image the adjustment process and the readout process. A driver circuit for driving this image-taking element and an A/D converter circuit for converting the analog image signal outputted from the image-taking element into a digital signal may also be included in the image-taking device.

The readout device is for carrying out processes of taking in image data generated by the image-taking device and decoding the data encoded into the optical data code included in this image. It may be formed by a computer that incorporates a program for carrying out all these processes mentioned above but at least a part of these processes may be carried out a dedicated calculation circuit. A memory that belongs to this computer may serve to store the image to be processed.

The adjustment device may be formed as a part of the computer identified as the readout device but it is preferable to provide it as a dedicated calculation circuit because the time required for the adjustment can be shortened by sequentially taking in and processing the same image data outputted from the image-taking device while they are being inputted into the memory. If it can determine whether or not the image data need to be adjusted at the same timing as they are being stored in the memory, furthermore, the readout process can be started immediately on the data determined not to require any adjustment. The image-taking device may be adjusted on the shutter speed, the output gain or the opening. The illumination device may be adjusted by way of at least one selected from the intensity, direction and color of illumination.

The area to be set by the adjustment means may be of any size but it should preferably be large enough to sufficiently include the pattern of brightness-darkness variation of the an optical data code when an area has been set so as to include the pixels representing the code. In the case of a two-dimensional code, the size is set so as to cover a plurality of cells. In the case of a bar code, the size may be set so as to cover a plurality of its bars. The aforementioned area may be a one-dimensional area extending in the horizontal or vertical direction or a two-dimensional area having a specified size in each of the two directions. Not all of these areas need be of the same size. The size of the areas may be made variable such that those likely to contain a code are larger than the others.

"Variation amplitude of brightness in an area" may be obtained as the absolute value of the difference between the maximum and minimum values of brightness within the area. If there are a plurality of brightness peaks within an area, the difference between the average brightness of the peaks and the average brightness of the valleys may be obtained. As another example, the total of the heights of the peaks may be obtained. As still another example, differences of mutually adjacent pairs of pixels may be obtained and the variation amplitude of brightness may be obtained as a cumulative sum of these differences.

In the case of processing an optical data code with arranged white and black areas such as a two-dimensional code or a bar code, changes in brightness and darkness may be considered to appear in areas set at positions containing pixels representing the code. In other words, it may be believed that the variation amplitude of brightness will be greater in an area including pixels that represent the code than in an area including only a background portion of the code. The present invention is based on this observation and the image-taking and illumination conditions are adjusted by using image data of an area where the variation amplitude of brightness is greater than a specified threshold value. Thus, an adjustment is made possible by reflecting the brightness of an optical data code.

The single area where the variation amplitude of brightness is the greatest may be used for the adjustment process but if there are a plurality of areas where the variation amplitude of brightness becomes greater than the threshold value, the adjustment process may be carried out by using the image data of these plurality of areas. In such a situation, the maximum and minimum brightness values may be extracted from each of the areas and the adjustment process may be carried out based on the averages of these values.

An optical data code reader of this invention may be formed such that the image-taking device serves to serially output the image data of individual pixels to the adjustment device and that the adjustment device serves to receive the image data outputted from the image-taking device and, after receiving image data of a specified number of pixels, to extract a variation amplitude of brightness for an area comprised of the specified number of pixels.

According to this embodiment of the invention, an image-taking element of the serial output type such as an CCD is incorporated in the image-taking device and the process of extracting the variation amplitude of brightness for each area can be carried out by using the image data outputted from this image-taking device nearly simultaneously as that of storing the image.

An optical data code reader according to another embodiment of the invention may be formed such that the image-taking device serves to output image data of a specified pixel and the adjustment device serves to sequentially specify pixels corresponding to the plurality of areas, to thereby cause the image data of each of the areas to be outputted to the image-taking device and to extract a variation amplitude of brightness for each of the areas.

According to this embodiment of the invention, an image-taking element of the random-access type such as an MOS may be incorporated in the image-taking device. In this case, too, the process of extracting the variation amplitude of brightness for each area can be carried out while sequentially reading out the image data of each area nearly simultaneously as that of storing the image. Moreover, since image data of any pixel can be read out by specifying an area, the quantity of data to be processed can be reduced if the areas are set by providing intervals in between and hence the adjustment process can be carried out more speedily. Since the positions and sizes of the areas can be varied, furthermore, the areas can be adjusted according to the size of the code to be read out.

According to a preferred embodiment of the invention, the adjustment device serves to extract brightness differences between mutually adjacent pixels and to integrate the brightness differences for each of the areas, to thereafter extract one of the areas where the integrated value is the largest and to carry out the adjustment process based on the maximum brightness value of the extracted area. According to this embodiment, the difference in brightness becomes large between mutually adjacent pixels over a boundary part where the brightness changes. In an area that is set where the brightness of the optical data code changes, the integrated value of the brightness changes may be expected to become large. In an area that is set where the brightness variation is small such as a background portion, on the other hand, the integrated value of the brightness changes may be expected to become smaller although it is brighter than its surroundings. Thus, if it can be assumed that an optical data code is included in the field of vision of the image-taking device, pixels showing the code are included in the area where the integrated value of the brightness differences is the largest. If the adjustment process is carried out based on the maximum brightness in the area where this integrated value is the largest, therefore, the adjustment process can be carried out in a way best suited for reading out the optical data code.

The adjustment device may be adapted to judge whether or not the brightness of the image data outputted from image-taking device is within a specified numerical range and to adjust the shutter speed of the image-taking device based on a specified condition if the brightness of the image data is judged to be outside the specified numerical range. This numerical range may be set according to the level of brightness at which the optical data code can be read out. In other words, the range can be set so as to exclude levels at which the existence of a code can hardly be ascertained such as images with the brightness level at a saturated condition or images with the brightness level too low such that bright and dark portions thereof cannot be distinguished. Thus, a large-scale adjustment can be carried out, say, by significantly altering the shutter speed in the case of an image on which the code can hardly be read out such that the level adjustment can be carried out quickly.

The adjustment device may be structured so as to carry out the adjustment process until the variation amplitude of brightness in at least one of a plurality of areas becomes greater than a specified threshold value after driving the image-taking device in response to an inputted trigger signal for a readout process and to drive the image-taking device again under the adjusted conditions. In this case, the readout device may serve to carry out the readout process, conditioned upon the end of the adjustment process by the adjustment device, by using the currently newest image data.

In the above, the trigger signal may be inputted by the user's operation or from an external apparatus or a sensor for inspecting a workpiece. The "specified threshold value" may be set according to the variation amplitude of brightness extracted in the case of an optical data code with a proper brightness. According to this embodiment, the adjustment process can be completed after the image-taking and adjustment processes are repeated for a plural number of cycles after the trigger signal is inputted and at the point in time when the brightness of the code has become appropriate in the image. Thus, the "currently newest image data" in the above may be interpreted as meaning the image data obtained by an image-taking process under the condition after the final adjustment process has been carried out.

An operating part for inputting the trigger signal may be provided. In this case, the adjustment device serves to judge appropriateness of focused condition of the image-taking device by using maximum and minimum brightness values in the area used for the adjustment process, and the adjustment device serves to drive the image-taking device again if it is judged that the focused condition is appropriate. In the above, "area used for the adjustment process" means the area at which the variation amplitude of brightness becomes greater the specified threshold value.

In the case of a hand-held type of optical data code reader, the operating part may comprise a button (or buttons) for inputting a command for a readout, that is, a specified number of cycles of the image-taking and adjustment processes are carried out as the user operates on the button (or one of the buttons) while hold a readout head including the illuminator device and the image-taking device against a target workpiece to be processed and the readout process using an image after the adjustment is carried out.

According to this embodiment, not only an appropriate variation amplitude of brightness but an appropriate focused condition is a necessary condition for staring the readout process. If the code reader is not placed at an appropriate position, the decoding may fail because the focused condition is not appropriate and hence the distinction between bright and dark cannot be adequately possible although there may be no problem regarding the level of brightness. In such a situation with an inappropriate focused condition, the image-taking process is carried out against instead of the adjustment process. If the user adjusts the setting position of the code reader and the focused condition becomes appropriate, it becomes possible to carry out the readout process by finishing the adjustment process. Appropriateness of the focused condition may be determined by using the slope between the maximum and minimum values of brightness in the aforementioned area. If there are a plurality of such maximum and minimum values, slopes between mutually adjacent pairs of maximum and minimum values are obtained and their average is calculated.

In summary, this invention successfully presents an optical data code reader capable of adjusting its image-taking illumination conditions based appropriately on the brightness of the optical data code within an image and hence an image can be obtained by setting conditions that are suitable for reading out the code contained therein.

BRIEF DESCRIPTION OF THE DRAWINGS

FIG. 1 is a diagonal backside view of a two-dimensional code reader embodying this invention.

FIG. 2 is a diagonal view of the front side of the two-dimensional code reader of FIG. 1.

FIG. 3 is a sketch showing the structure of the optical system of the two-dimensional code reader of FIGS. 1 and 2.

DETAILED DESCRIPTION OF THE INVENTION

Figure 4:
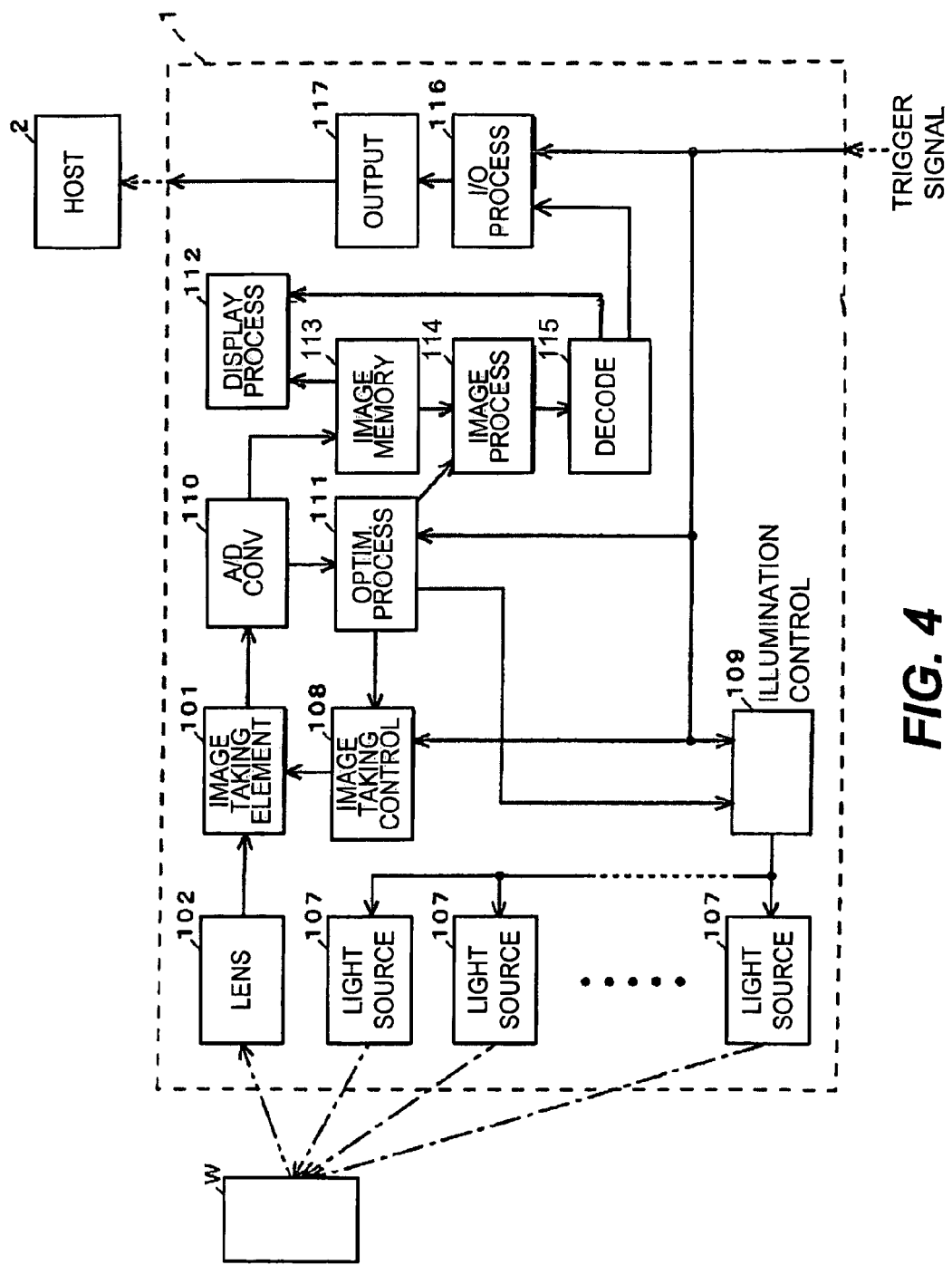
FIG. 4 is a functional block diagram of the two-dimensional code reader of FIGS. 1-3.

FIGS. 1 and 2 show external views of a two-dimensional code reader 1 according to an embodiment of this invention, FIG. 1 showing its back side and FIG. 2 showing its front side. Numeral 10 indicates a case serving as the main body of the code reader 1, having a reading window 11 on the upper part of its front surface and a monitor 12 with a liquid crystal panel 12a on an upper portion of its back surface. The lower half of the case 10 functions as a handling part 13 with a retracted front side. Operating buttons 14 are provided on both side surfaces of the case 10 for indicating the start of a readout process.

An optical system to be described below and a base board (not shown) mounting circuits of various kinds are contained inside the case 10. This base board is connected to a host apparatus 2 (shown in FIG. 4) through a cord 15 that contains input-output lines and a power line and is led out of the bottom end part of the case 10.

FIG. 3 shows the structure of the optical system incorporated in the code reader 1 behind the reading window 11, including an image-taking element 101, an imaging lens 102, a mirror 103, an illuminator 104 with a light-emitting surface and an LED lamp 105. In FIG. 3, symbol "W" indicates a workpiece having a two-dimensional code thereon.

The illuminator 104 is positioned such that its light-emitting surface is parallel to the reading window 11. Chip LEDs (not shown) for different colors are arranged inside this illuminator 104. The color and brightness of the emitted light can be changed by controlling the number and positions of these LEDs that are switched on.

The LED lamp 105 is for the purpose of illuminating the workpiece W diagonally and is set at a specified distance from the illuminator 104 with its optical axis tilted by a specified angle. Although only one LED lamp 105 is shown in FIG. 3, a plurality of such lamps may be provided and their optical axes may be variously oriented.

The light emitted from the illuminator 104 and the LED lamp 105, after being reflected from the upper surface of the workpiece W, is led to the image-taking element 101 by means of the mirror 103 and the lens 102. The image-taking element 101 functions under this light-receiving condition to generate an image of the workpiece W with a two-dimensional code. The generated image is transmitted to a processing circuit on the base board for carrying out adjustment and readout processing to be described below.

The functions of the code reader 1 are explained next with reference to FIG. 4.

The code reader 1 is comprised of an image-taking control part 108, an illumination control part 109, an A/D converter 110, an optimization processing part 111, a display processing part 112, an image memory 113, an image processing part 114, a decoding part 115, an input-output processing part 116 and an output part 117. Of the above, the image processing part 114, the decoding part 115 and the input-output processing part 116 each represent a function set in a CPU of a microcomputer and the others are each realized as a dedicated circuit for the respective function. In the figure, "trigger signal" indicates a signal that is generated as the aforementioned operating buttons 14 are operated. The chip LEDs contained in the illuminator 104 and the LED lamp 105 for diagonal irradiation are represented as a plurality of light sources 107.

The image-taking element 101 according to the present example is a CCD and is adapted for a serial output of image data from pixels in response to drive signals from the image-taking control part 108. The image data are stored in the image memory 113 after being converted to digital data by means of the A/D converter 110 and are also transmitted to the optimization processing part 111. Each of the light sources 107 are switched on and off in response to drive signals from the illumination control part 109.

After extracting a two-dimensional code pattern from the image stored in the image memory 113, the image processing part 114 separates white and black cells in the code by a binarization process and encodes the optical data represented by each cell. The decoding part 115 is for decoding the optical data of the two-dimensional code, say, by separating this encoded data arrays in certain units (such as 8 bits). The decoded data (hereinafter referred to as "readout data") are transmitted from the input-output processing part 116 to the output part 117 to be thereafter outputted to the host apparatus 2.

The display processing part 112 is for displaying the image of the two-dimensional code to be read out or the aforementioned readout data on the monitor 12. The timing of this display process and the contents of data to be displayed are controlled by the aforementioned CPU.

The trigger signal outputted by operating the operation buttons 14 is transmitted to the image-taking control part 108, the illumination control part 109, the optimization processing part 111 and the input-output processing part 116. In response to this trigger signal, the image-taking control part 108, the illumination control part 109 and the optimization processing part 111 operate to carry out an image-obtaining process to be described below to thereby obtain an image that is suitable for a readout process. The input-output processing part 116, on the other hand, waits, when the trigger signal is received, until readout data are received from the decoding part 115. When the readout data are received, the input-output processing part 116 functions to output the received readout data through the output part 117 to the host apparatus 2.

In what follows, the series of processing carried out by the image processing part 114 and the decoding part 115 will be referred to as the readout processing. After the trigger signal is received and the first image-taking process is carried out, the optimization processing part 111 uses the generated image to adjust the shutter speed and the illumination intensity. The readout process is started as the image-taking and adjustment processes are repeated for a specified number of cycles and an image suitable for readout is generated.

Next, the adjustment process carried out by the optimization processing part 111 will be explained.

The brightness data on the pixels that are outputted from the image-taking element 101 and converted by the A/V converter 110 (hereinafter referred to as pixel data) are sequentially inputted to the optimization processing part 111. The optimization process part 111, while taking in these pixel data, divided them into a plurality of areas and extract one of them where the characteristic of the two-dimensional code is best reflected. The image-taking and illumination conditions are adjusted by using the image data of this extracted area.

Figure 5:
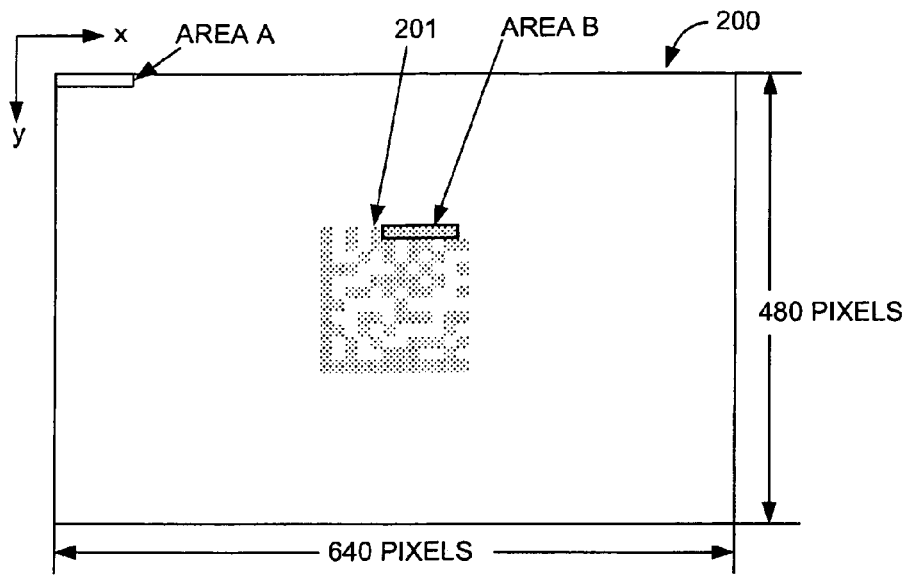
FIG. 5 is a drawing for showing an example of an area set for a target image for processing.

FIG. 5 shows an example of how an area may be set for an image 200 of a two-dimensional code. In this example, the image 200 (target image) to be processed includes 640 pixels in the horizontal direction (along the x-axis) and 480 pixels in the vertical direction (along the y-axis) and the pixel data are sequentially outputted along the x-direction. The optimization process part 111 is adapted to carry out calculations by taking in these pixel data and separating them in units of 64 pixels. Explained more in detail, a differentiation calculation for obtaining the difference in brightness between mutually adjacent pixels and an integration calculation for obtaining the total of these differences in brightness are carried out for each area.

The processes as described above is carried out in a total of 4800 areas (10 in the direction of the x-axis and 480 in the direction of the y-axis) each including 64 pixels aligned one-dimensionally in the direction of the x-axis, extracting the width of variations of brightness within the area.

FIG. 5 shows two of such areas A and B, Area A being in the background part and Area B including a two-dimensional code 201. The brightness distributions over portions of Areas A and B are respectively shown in FIGS. 6A and 6B. For the convenience of description, each cell in FIGS. 6A and 6B (as well as FIG. 8 to be described below) represents 5 pixels.

Figure 6A:
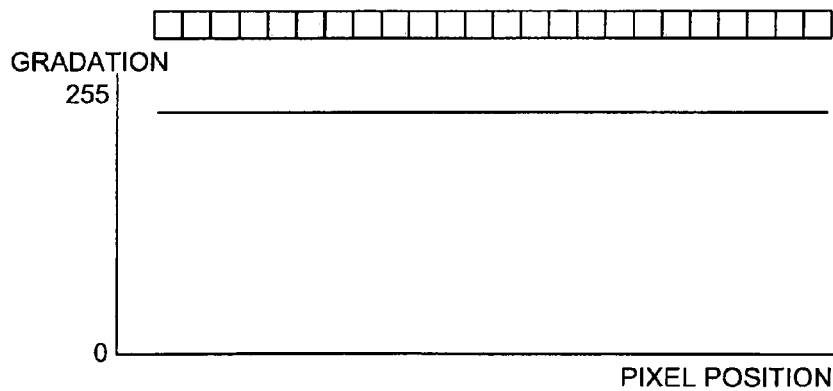
FIGS. 6A and 6B show brightness distribution in Areas A and B of FIG. 5.
Figure 6B:
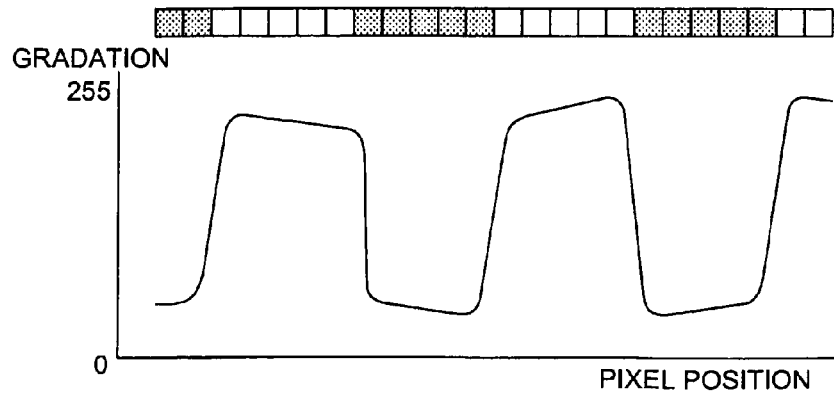

If the background part having no two-dimensional code is considered to be of uniform brightness, there is hardly any change in brightness inside Area A set inside the background part, as shown in FIG. 6A. The differences in brightness between mutually adjacent pixels are extremely small and their total (their integrated value) may be considered to be close to zero.

In an area over a two-dimensional code, on the other hand, a large change in brightness occurs at boundaries between a white pixel and a black pixel. In Area B set over a two-dimensional code, therefore, the brightness difference becomes large between pixels at such a boundary portion and such difference values are reflected in the integrated value.

Based on this principle, the area in which the total (integrated) value of the differences in brightness is the largest is selected out of the 4800 areas according to this example and is extracted as the area that best reflects the characteristic of the two-dimensional code, and the image data of this area are used to adjust the shutter speed of the image-taking element 101.

Figure 7:
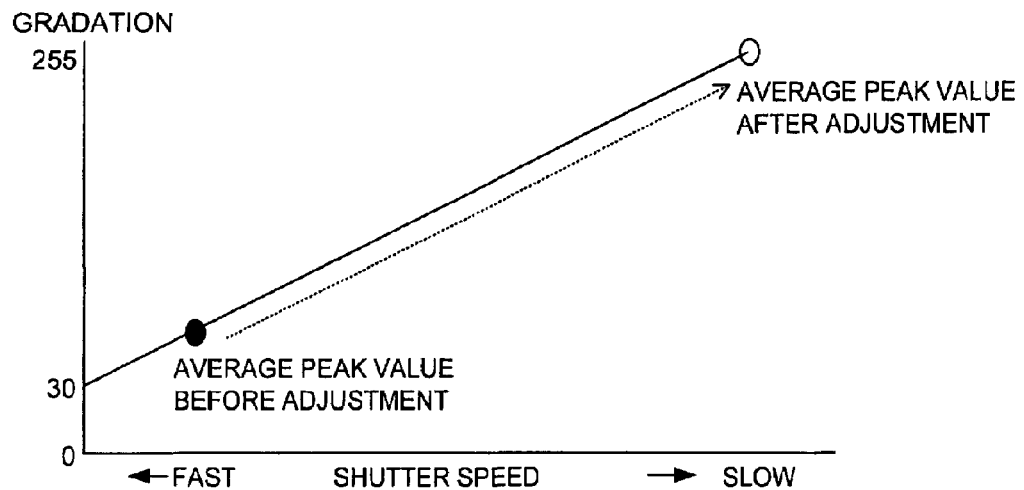
FIG. 7 is a drawing for showing a method of adjusting the shutter speed.

The shutter speed is adjusted by using the maximum brightness value (hereinafter referred to as the peak value). For convenience, the brightness value is herein expressed in "gradations". If it is totally dark the gradation will be zero, the gradation number increasing as it becomes brighter. If the image data are 8-bit data, for example, the shutter speed is adjusted such that the average value of all peaks in the area (hereinafter referred to as the average peak value) will be nearly 255th gradations, as shown in FIG. 7.

In the case of a peak with the peak value nearly equal to 255 gradations before the adjustment, however, there is a probability of occurrence of a halation because of too much light entering the image-taking element 101. Since a signal of about 30 gradations is outputted from the image-taking element 101 even when there is no incident light at all, brightness and darkness can hardly be distinguished if the brightness of the image is about 30 gradations. This condition is referred to as the darkness condition. For this reason, according to this example, the shutter speed is set at one quarter (¼ times) of the current value to reduce the exposure time if the smallest brightness value of the image before the adjustment is 250 gradations or more and at four times longer if the largest brightness value of the image before the adjustment is 35 gradations or less for a longer exposure.

Figure 8:
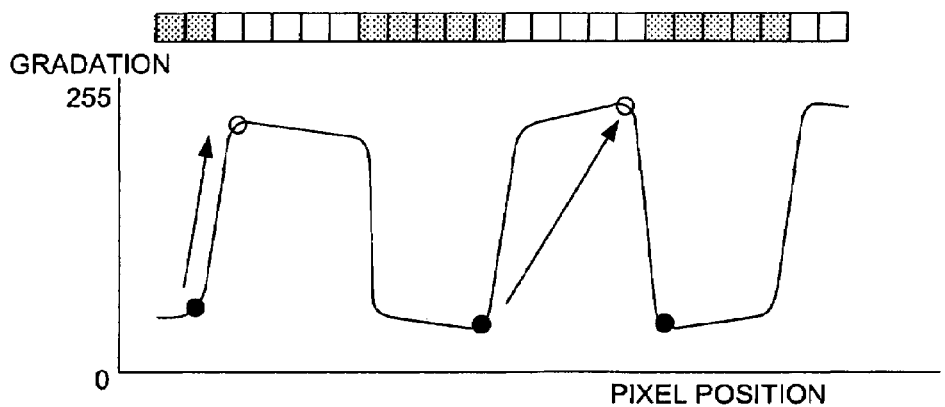
FIG. 8 is a drawing for showing an example of method of extracting a parameter for judging appropriateness of a focused condition.

Even after the shutter speed is adjusted and the image brightness becomes appropriate, the accuracy of code readout becomes poorer if the focus is not exactly on the two-dimensional code. In this example therefore, the amplitude of brightness variations is extracted for each area even on an image after the shutter speed has been adjusted and the appropriateness of the focused condition is determined by using the minimum value of brightness in the area with a maximum variation amplitude (hereinafter referred to as the bottom) and the aforementioned peak. Explained more in detail, the slope of the change in brightness is obtained as shown in FIG. 8 from the bottom (indicated by a block circle) to the peak (indicated by a white circle) and the focused condition is considered to be appropriate if this slope is greater than a specified threshold value.

Since the two-dimensional code reader 1 of this example is of a hand-held structure, the focus-adjustment processing is intended to be carried out by the user. If the focused condition is appropriate, a readout process is started by using the image at that moment. If the focused condition is not appropriate, the read process is not carried out but an image-taking process is carried out again. If the user adjusts the position of the code reader 1 and the focal point is properly set, the image obtained after the adjustment is used for the readout processing.

Figure 9:
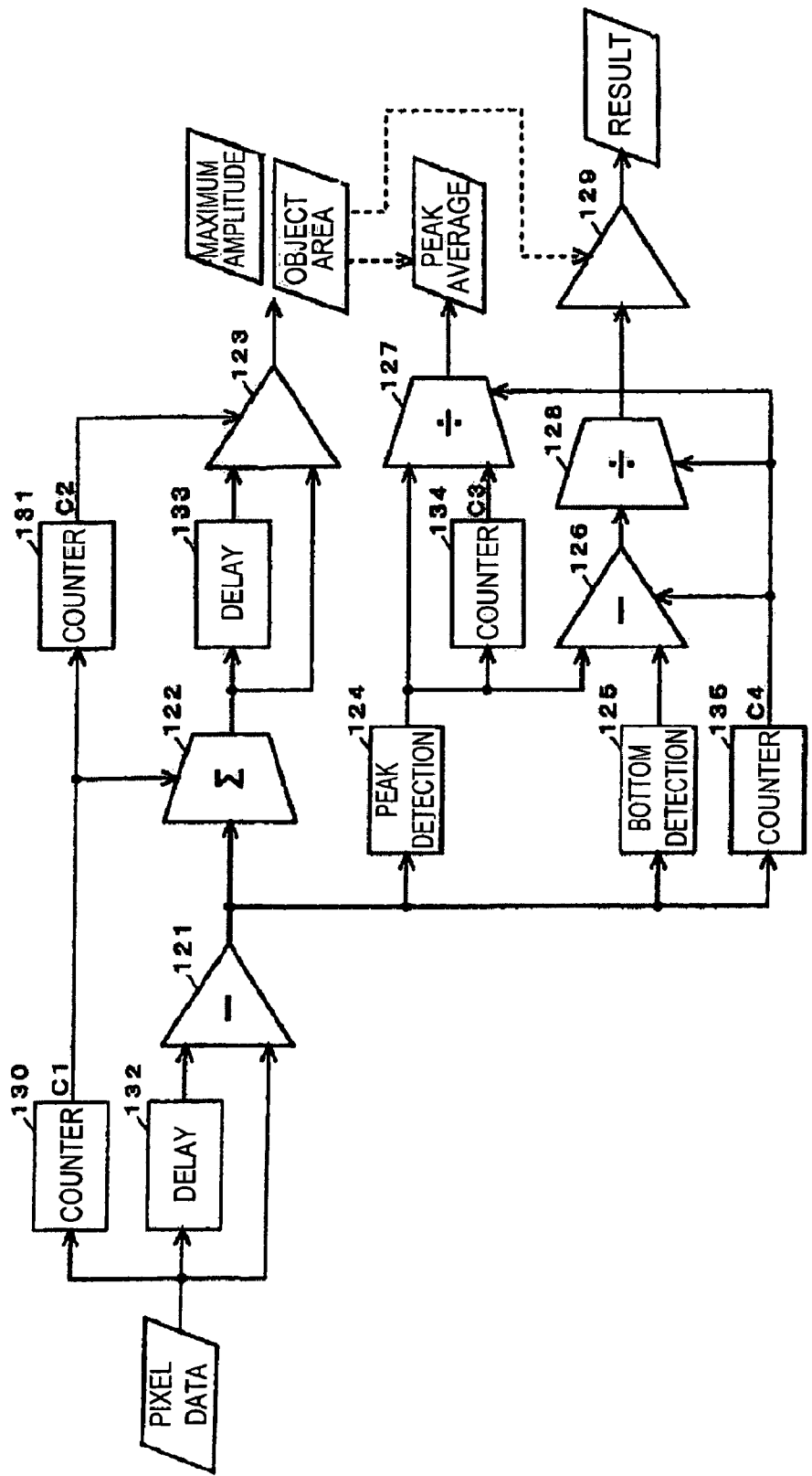
FIG. 9 is a block diagram of the optimization processing part 111 for showing its principal structure.

FIG. 9 is a block diagram for showing the principal functions of the optimization processing part 111, including a (first) differencing circuit 121, an integration circuit 122, a (first) comparison circuit 123, a peak detection circuit 124, a bottom detection circuit 125, another (second) differencing circuit 126, two division circuit 127 and 128 and another (second) comparison circuit 129. Numeral 130 in the figure indicates a (first) counter for counting pixels that constitute one area, and its counted value C1 changes within the range of 0-64. Numeral 131 indicates another (second) counter for counting the number of processed areas, and its counted value C2 changes within the range of 0-4800.

The data array of each of the pixel data that form the image (hereinafter referred to as the pixel data array) is transmitted both to the first counter 130 and to the first differencing circuit 121. It is also delayed by one pixel by means of a delay circuit 132 on the upstream side of the first differencing circuit 121, and the first differencing circuit 121 calculates the difference between the data value of the previous pixel kept by the delay circuit 132 and the currently inputted pixel data value.

A comparison circuit for judging the sign (positive or negative) of the result of the aforementioned calculation and a circuit for converting a negative calculation result into a positive value (neither shown) are included in the integration circuit 122 which serves to calculate the absolute values of the differences detected by the differencing circuit 121. This integration calculation is carried out in units of 64 pixels based on the counted value C1 by the first counter 130. As the cumulative addition on the 64th pixel is completed, the integrated value obtained at that moment is outputted to the downstream side and the content of the circuit is cleared to make ready for the next integration calculation. It is in this manner that a variation amplitude value for each of the 4800 areas is extracted.

These variation amplitude values of the areas obtained by the integration circuit 122 are sequentially received by the comparison circuit 123 and compared with the variation amplitude value of an earlier processed area. The larger of the compared values is selected according to this example and this selected value and the corresponding value of the counter C2 are together saved by a register (now shown). These comparison processes are started when the count of the counter C2 is 2. In the first of these processes, the comparison is made with the integrated value obtained immediately previously that is saved in the delay circuit 133 on the upstream side (the variation amplitude in the first area). Thereafter, comparisons are made with that variation amplitude value kept in the aforementioned register.

At the end eventually, the comparison circuit 123 extracts the largest of the variation amplitudes in brightness of the areas (hereinafter referred to as the maximum variation amplitude) and outputs the count number C2 corresponding to this maximum variation amplitude, indicative of the position of the area where the maximum variation amplitude is obtained. This corresponding area indicated by the count number C2 is hereinafter referred to as the object area.

Next, the peak detection circuit 124 detects a brightness peak, for example, by differentiating the output values from the differencing circuit 121. A still another (third) counter 134 is provided on the downstream side of the peak detection circuit 124 and serves to count the number C3 of detected peaks.

The division circuit 127 serves to calculate the aforementioned average peak value by dividing the total of peak values by C3. There is still another (fourth) counter 135 which is for counting the number C4 of outputs from the differencing circuit 121 and is cleared for every 64 pixels like the first counter 130 described above. This calculation of the average peak value is carried out every time when the number C4 is counted up by the fourth counter 135. The average peak value for each area is thus outputted from the division circuit 127. These average peak values are transmitted to a selection circuit (not shown) adapted to select the average peak value of the aforementioned object area. This average peak value is used for the adjustment of the shutter speed.

The bottom detection circuit 125 is for detecting the bottom of brightness by carrying out a process similar to that by the peak detection circuit 124 except on the output values form the differencing circuit 121.

The count number C4 by the fourth counter 135 is saved in a register or the like whenever a detection is made by the bottom detection circuit 125 or the peak detection circuit 124 as a data item showing the detection position. The second differencing circuit 126 serves to input the value of the peak detected by the peak detection circuit 124, the value of the bottom detected by the bottom detection circuit 125 and their detection positions and to combine a peak and a bottom in the order in which they are detected, obtaining the difference between these values. Next, the second division circuit 128 divides the output value from the differencing circuit 126 by the distance between the peak and the bottom to obtain the slope of the change in brightness therebetween. The peak-bottom distance can be obtained from the detection positions shown by the counter C4. The division circuit 128 includes a circuit for averaging the slopes of brightness changes obtained for all peak-bottom combinations for all areas.

The differencing circuit 126 and the division circuit 128, too, carry out their calculations for each area every time the counter 135 is counted up and is cleared. Of the outputs from the division circuit 128, the one that corresponds to the object area is taken in by the comparison circuit 129 and is compared with a specified threshold value. This comparison output serves to indicate the appropriateness of the aforementioned focused condition.

Although not shown in FIG. 9, the optimization processing part 111 is further provided with a circuit adapted to take in pixel data arrays and to detect maximum and minimum brightness values from the entire image and a circuit for judging the occurrence of halation or a dark condition. As the image-taking element 101 is activated and pixel data arrays are outputted, all such circuits of the optimization processing part 111 are also activated to carry out in parallel processes for calculating the average peak value at the position of the maximum variation amplitude, judging whether the focusing condition is appropriate and determining whether the halation or a dark condition has occurred. Results of these processes are transmitted to a control circuit (not shown) adapted to compare numbers indicative of these results with specified threshold values in a specified sequence and to select a value based on the results of such comparisons. An adjustment process is carried out based on this selected value and the data type indicated by this value.

Figure 10:
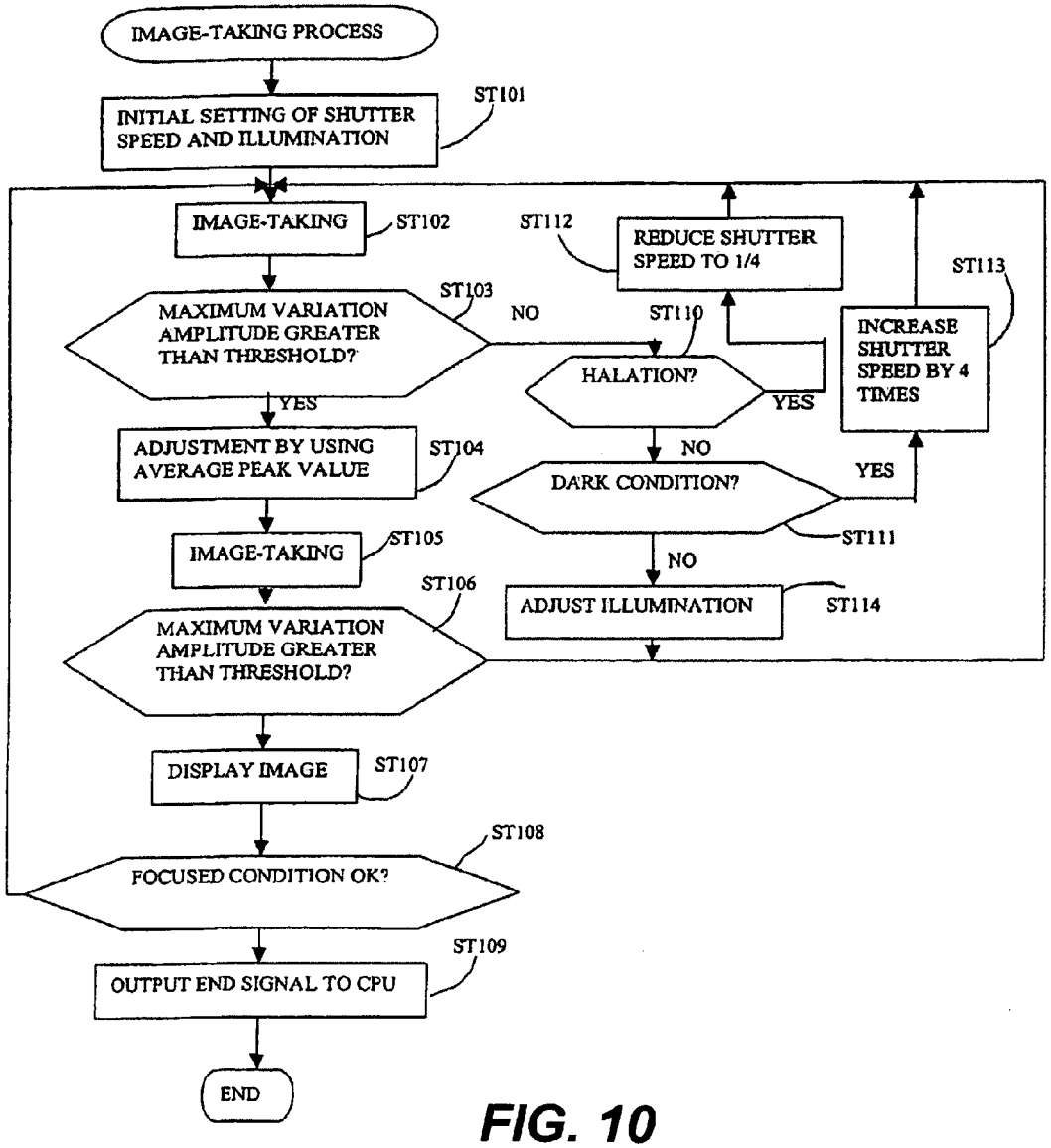
FIG. 10 is a flowchart of the image-taking process.

FIG. 10 is a flowchart for showing details of processes carried out by the optimization processing part 111 in response to the input of the trigger signal.

As the trigger signal is inputted, initial values of the shutter speed and the illumination intensity are provided from the optimization processing part 111 to the image-taking control part 108 and the illumination control part 109 (Step ST101) and an image of a two-dimensional code is obtained (Step ST102). After an amplitude of brightness variations is extracted from each area as explained above by this image-taking process, a maximum variation amplitude and an object area are identified and an average peak value at this object area, the judgment results on the appropriateness of the focused condition and the occurrence of halation and dark conditions are generated.

In the above, if the maximum variation amplitude at the object area (as outputted from the comparison circuit 123) is above a specified threshold value (YES in Step ST103), the shutter speed is adjusted by using the average peak value of this object area (Step ST104) and a second image-taking process is carried out thereafter based on the adjusted shutter speed (Step ST105).

Each circuit of the optimization processing part 111 functions in the same way for this second image-taking process as for the first image-taking process, and if the maximum variation amplitude is above the threshold value (YES in Step ST106), the image at this point in time is displayed on the monitor 12 (Step ST107). The control of this display is carried out by a CPU in response to a signal from the optimization processing part 111. If the focused condition of the image obtained in Step ST105 is thereafter judged to be appropriate (YES in Step ST108), an "end signal" is outputted to the CPU (Step ST109) to complete the process.

If the maximum variation amplitude on the image obtained by the first image-taking process is below the specified threshold value, adjustments based on maximum and minimum brightness of the image as a whole are carried out. If the minimum value is 250 gradation or above and presence of halation is assumed (YES in Step ST110), the shutter speed is set to ¼ of the current value (Step ST112). If the maximum value is below 35 gradations and a dark condition is assumed to be present (YES in ST111), the shutter speed is set to 4 times the current value (Step ST113). If both the maximum and minimum values are within the range of 35-250 gradations (NO in Steps ST110 and ST111), the shutter speed is not changed while the illumination intensity is adjusted (Step ST114). This adjustment may be effected, for example, by switching on a specified number of light sources that are currently extinguished or switching off a specified number of light sources that are currently lit such that the maximum value comes to be at a specified standard level.

If the maximum variation amplitude is not sufficiently large (NO in Step ST106), Step ST102 of taking an image is repeated after these adjustments are made, that is, under the adjusted conditions. If the maximum variation amplitude by this newly taken image comes to be above the specified threshold value (YES in Step ST103), the processes of Step ST104 et seq. are carried out.

If the focused condition of the image obtained in Step ST105 is not judged to be appropriate (NO in Step ST105), the "end signal" to the CPU is not outputted and another image is taken in Step ST102. The adjustment steps described above are thereafter repeated on this newly taken image.

According to this example, the conditions for judging the focused condition to be appropriate include not only that the focused condition of the output from the comparison circuit 129 should be appropriate but also that the average peak value of the object area should be above a specified value.

This image-taking process as described above is adequate even in a situation where the user has erroneously caused a changed in the position of the code reader 1. If the code reader 1 happens to be displaced at the time of Step ST105 after the shutter speed has been adjusted such that no two-dimensional code is included any longer in the area to be photographed, the maximum variation amplitude on the image obtained at this time will not reach the threshold value and the judgment in Step ST106 becomes NO, requiring another image to be taken (Step ST102) and the adjustment steps to be repeated.

Thus, the user will adjust the position of the code reader 1 if the focused condition is not appropriate or the target code disappears from the field of vision such that an appropriate image can be obtained. Since the image that is displayed in Step ST107 is saved until Step ST107 is carried out next, the user can carry out the adjustment operations while checking on the appropriateness of the focused condition.

Figure 11:
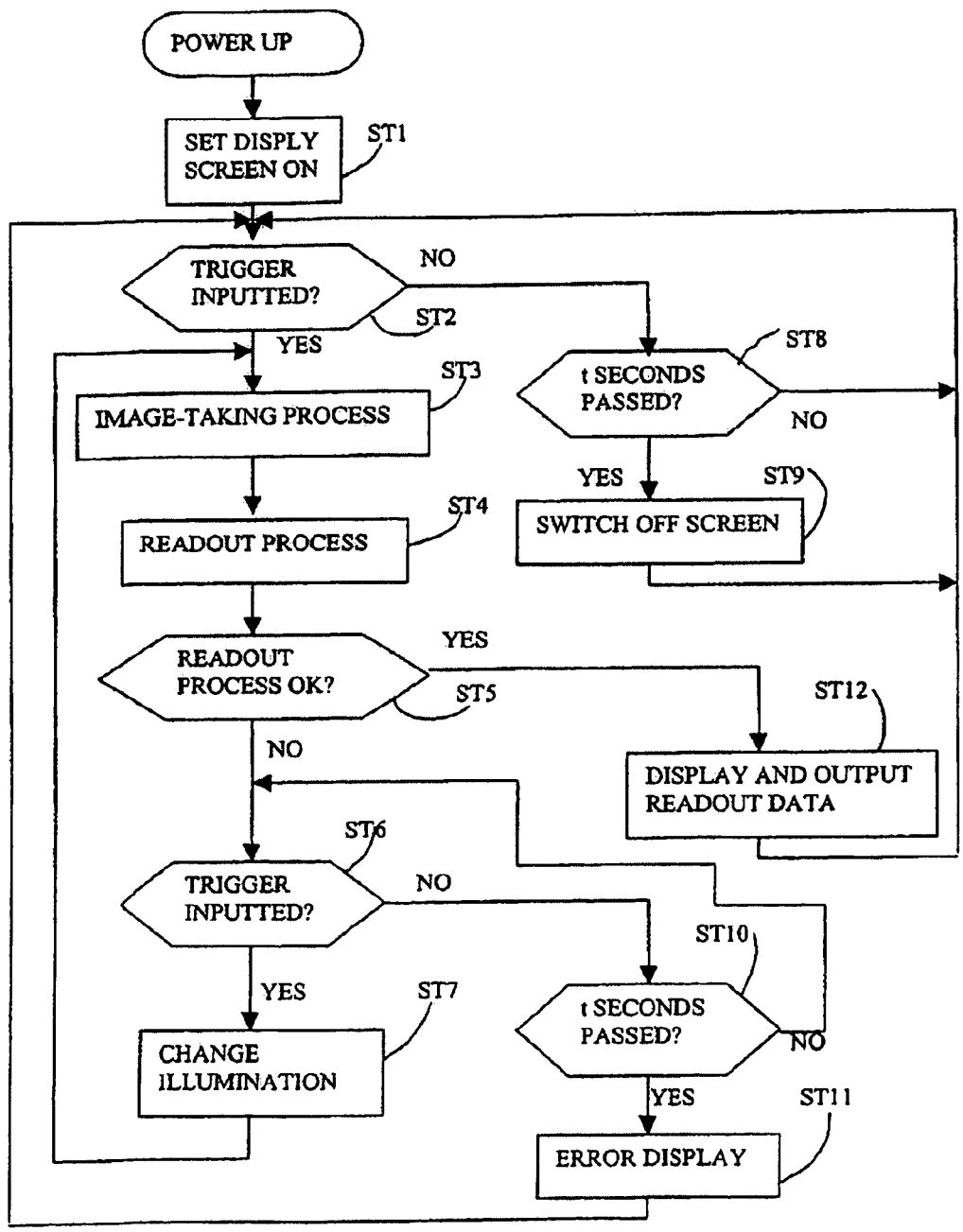
FIG. 11 is a flowchart of the processes for a two-dimensional code reader.

FIG. 11 shows the series of operations carried out by the code reader 1. As power is supplied to activate it, the display screen is switched on (Step ST1). As a trigger signal is inputted thereafter (YES in Step ST2), the image-taking process shown in FIG. 10 is carried out (Step ST3). After an image with appropriate brightness and focused condition is thereby obtained, the image processing part 114 and the decoding part 115 start a readout process (Step ST4).

If optical data are successfully read out by this readout process (YES in Step ST5), the obtained readout data are displayed by the monitor 12 and outputted to the host apparatus 2 (Step ST12). If the readout process fails (NO in Step ST5), the illumination condition is changed (Step ST7) in response to the next trigger signal (YES in Step ST6) and the image-taking process of Step ST3 is carried output again.

The process in Step ST7 is carried out, for example, by changing the diffusion illumination by the illuminator 104 into the screening illumination by the LED lamp 105 or by the color of the illuminator 104.

If no trigger signal is inputted within a specified length of time (t seconds) after the activation (YES in Step ST8), the screen of the monitor 12 is extinguished (Step ST9). If no trigger signal is inputted within the specified time (t seconds) after the readout failure (YES in Step ST10), an error display is made by the monitor 12 and the input of the trigger signal is waited for (Step ST2). Although not shown in FIG. 11, if the trigger signal is inputted after the monitor screen is extinguished (Step ST9), the screen is switched on again.

With a two-dimensional code reader 1 thus structured, as the user operates on either of the operating buttons 14 with the reading window 11 facing in the direction of the workpiece W, the image-taking process and the adjustment process for the shutter speed are carried out repeatedly for a specified number of cycles and an image appropriate for the readout process is obtained. A large portion of time for the adjustment process is spent for taking in aforementioned pixel data arrays. After the pixel data arrays thus obtained are stored in the image memory, there are only steps for adjusting the shutter speed and the illumination conditions which can be completed extremely quickly. Thus, the processing time is significantly reduced, compared with the method of making adjustments by using data stored in the image memory 113.

By the processing according to FIG. 10, an image suitable for readout can be obtained by two image-taking processes if the illumination condition and the focused condition are adequate, and the processing time can be reduced even more.

Preliminarily set standard values may be used as initial values to be set in Step ST101 of FIG. 10. Values that are immediately previously adjusted may be used. In this case, if the maximum variation amplitude of the image obtained by the first image-taking process (of Step ST102) is above the threshold value and the average peak value is above the specified level, the readout process may be carried out without adjusting the shutter speed.

By such a setting method, the process can be speeded up significantly when the code reader 1 need not be held by hand but may be set at a fixed position for repeating readout processes many times on workpieces of similar kinds. This is because, if the image-taking and illumination conditions can be appropriately determined for the first workpiece, the process can be repeated on the subsequent workpieces under approximately the same conditions.

Although the invention has been described above with reference to only one example, this is not intended to limit the scope of the invention. Many modifications and variations are possible within the scope of this invention. Although an example was explained above in which the brightness of the image is adjusted mainly by varying the shutter speed, this may be done by varying the output gain of the image-taking element 101. The brightness may be further adjusted by controlling an opening device (not shown).

Figure 12:
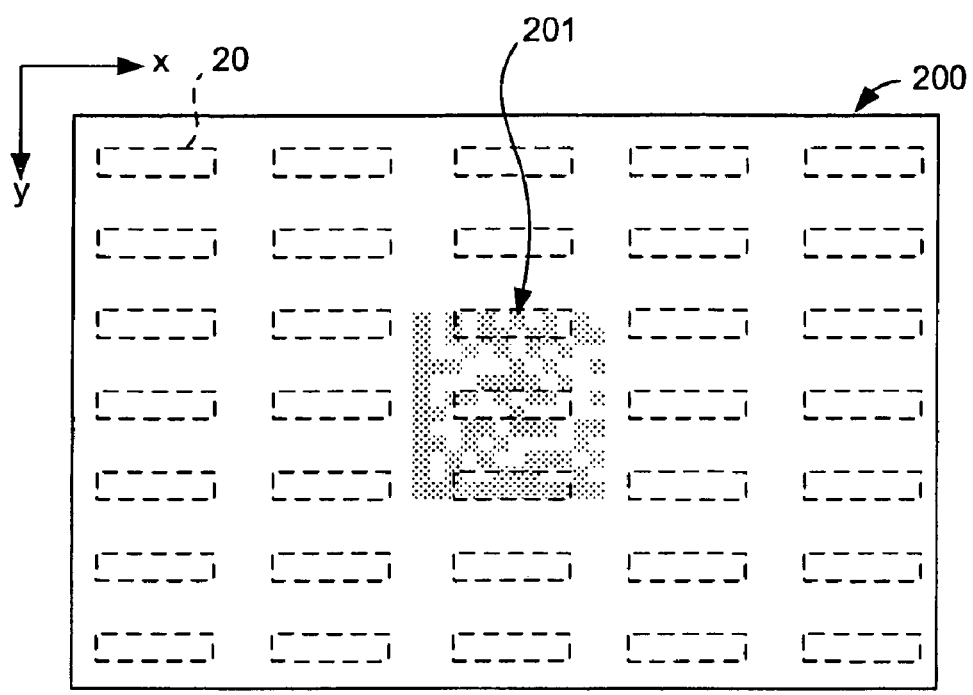
FIG. 12 is a drawing for showing another example of an area set for a target image for processing.

Instead of a CCD, an image-taking element capable of random access such as an MOS may be used. In this case, as shown in FIG. 12, areas 20 may be set at specified intervals on a target image 200 to be processed and the variation amplitude of brightness of each area can be obtained by sequentially reading out the pixel data corresponding to these areas 20. Thus, the quantity of the data too be processed can be reduced and the time required for the adjustment process can be significantly shortened. This method of processing can be used not only for area in which the pixels are arranged one-dimensionally but also for processing areas with pixels arranged two-dimensionally.

It goes without saying that it is desirable to carry out a readout process after the adjustment processing by taking an image based on the final adjustment and thereby obtaining a whole image of the two-dimensional code.

What is claimed is:

1. An optical data code reader comprising:
    an illuminator device for illuminating an optical data code to be read out;
    an image-taking device for taking an image of said optical data code;
    a readout device for decoding said optical data code by processing image data generated by said image-taking device; and
    an adjustment device for carrying out an adjustment process by adjusting at least one condition selected from the group consisting of illumination conditions of said illuminator device and image-taking conditions for said image-taking device such that said image data become suitable for being read out;
    wherein said adjustment device serves to set a plurality of areas for image data outputted by said image-taking device, to extract differences in brightness between mutually adjacent pixels and to cumulatively add said differences in brightness on each of said areas, to thereafter extract one of said areas where the cumulatively added value is the largest and to carry out said adjustment process by using image data of the extracted one of said areas with the largest cumulatively added value.

2. The optical data code reader of claim 1 wherein said image-taking device serves to serially output the image data of individual pixels to said adjustment device, and said adjustment device serves to receive said image data outputted from said image-taking device and, after receiving image data of a specified number of pixels, to extract a variation amplitude of brightness for an area comprised of said specified number of pixels.

3. The optical data code reader of claim 2 wherein said adjustment device serves to judge whether or not the brightness of the image data outputted from said image-taking device is within a specified numerical range and to adjust the shutter speed of said image-taking device based on a specified condition if the brightness of said image data is judged to be outside said specified numerical range.

4. The optical data code reader of claim 3 wherein said adjustment device, after driving said image-taking device in response to an inputted trigger signal for a readout process, serves to carry out said adjustment process until the variation amplitude of brightness in at least one of said plurality of areas becomes greater than the specified threshold value and to drive said image-taking device again under the adjusted conditions; and
    wherein said readout device serves to carry out said readout process, conditioned upon the end of the adjustment process by said adjustment device, by using the currently newest image data.

5. The optical data code reader of claim 4 further comprising an operating part for inputting said trigger signal, wherein said adjustment device serves to judge appropriateness of focused condition of said image-taking device by using maximum and minimum brightness values in the area used for said adjustment process, and wherein said adjustment device serves to drive said image-taking device again if it is judged that the focused condition is appropriate.

6. The optical data code reader of claim 2 wherein said adjustment device, after driving said image-taking device in response to an inputted trigger signal for a readout process, serves to carry out said adjustment process until the variation amplitude of brightness in at least one of said plurality of areas becomes greater than the specified threshold value and to drive said image-taking device again under the adjusted conditions; and
    wherein said readout device serves to carry out said readout process, conditioned upon the end of the adjustment process by said adjustment device, by using the currently newest image data.

7. The optical data code reader of claim 1 wherein said image-taking device serves to output image data of a specified pixel and said adjustment device serves to sequentially specify pixels corresponding to said plurality of areas, to thereby cause the image data of each of said areas to be outputted to said image-taking device and to extract a variation amplitude of brightness for each of said areas.

8. The optical data code reader of claim 7 wherein said adjustment device serves to judge whether or not the brightness of the image data outputted from said image-taking device is within a specified numerical range and to adjust the shutter speed of said image-taking device based on a specified condition if the brightness of said image data is judged to be outside said specified numerical range.

9. The optical data code reader of claim 8 wherein said adjustment device, after driving said image-taking device in response to an inputted trigger signal for a readout process, serves to carry out said adjustment process until the variation amplitude of brightness in at least one of said plurality of areas becomes greater than the specified threshold value and to drive said image-taking device again under the adjusted conditions; and wherein said readout device serves to carry out said readout process, conditioned upon the end of the adjustment process by said adjustment device, by using the currently newest image data.

10. The optical data code reader of claim 9 further comprising an operating part for inputting said trigger signal, wherein said adjustment device serves to judge appropriateness of focused condition of said image-taking device by using maximum and minimum brightness values in the area used for said adjustment process, and wherein said adjustment device serves to drive said image-taking device again if it is judged that the focused condition is appropriate.

11. The optical data code reader of claim 7 wherein said adjustment device, after driving said image-taking device in response to an inputted trigger signal for a readout process, serves to carry out said adjustment process until the variation amplitude of brightness in at least one of said plurality of areas becomes greater than the specified threshold value and to drive said image-taking device again under the adjusted conditions; and wherein said readout device serves to carry out said readout process, conditioned upon the end of the adjustment process by said adjustment device, by using the currently newest image data.

12. The optical data code reader of claim 1 wherein said adjustment device serves to judge whether or not the brightness of the image data outputted from said image-taking device is within a specified numerical range and to adjust the shutter speed of said image-taking device based on a specified condition if the brightness of said image data is judged to be outside said specified numerical range.

13. The optical data code reader of claim 12 wherein said adjustment device, after driving said image-taking device in response to an inputted trigger signal for a readout process, serves to carry out said adjustment process until the variation amplitude of brightness in at least one of said plurality of areas becomes greater than the specified threshold value and to drive said image-taking device again under the adjusted conditions; and wherein said readout device serves to carry out said readout process, conditioned upon the end of the adjustment process by said adjustment device, by using the currently newest image data.

14. The optical data code reader of claim 1 wherein said adjustment device, after driving said image-taking device in response to an inputted trigger signal for a readout process, serves to carry out said adjustment process until the variation amplitude of brightness in at least one of said plurality of areas becomes greater than the specified threshold value and to drive said image-taking device again under the adjusted conditions; and wherein said readout device serves to carry out said readout process, conditioned upon the end of the adjustment process by said adjustment device, by using the currently newest image data.

* * * * *